United States Patent [19]
Goodale

[11] 3,733,148
[45] May 15, 1973

[54] PUMP SUITABLE FOR A HYDRAULIC STEERING POWER SYSTEM HAVING AN AUXILIARY POWER SOURCE

[75] Inventor: William B. Goodale, Orchard Lake, Mich.

[73] Assignee: Ford Motor Company, Dearborn, Mich.

[22] Filed: June 2, 1970

[21] Appl. No.: 54,080

Related U.S. Application Data

[62] Division of Ser. No. 763,228, Sept. 27, 1968, abandoned.

[52] U.S. Cl. ............................................... 417/214
[51] Int. Cl. .............................................. F04b 49/00
[58] Field of Search ........................... 417/214, 279

[56] References Cited

UNITED STATES PATENTS

| | | |
|---|---|---|
| 3,002,462 | 10/1961 | Raymond .......................... 417/214 X |
| 736,778 | 8/1903 | Reason .............................. 417/214 X |
| 1,568,035 | 12/1925 | Reynolds .......................... 417/214 X |
| 2,495,151 | 1/1950 | Vickers ............................. 417/214 X |
| 1,517,782 | 12/1924 | Harper .............................. 417/214 X |

FOREIGN PATENTS OR APPLICATIONS 602,199   5/1948   Great Britain ....................... 417/214

Primary Examiner—Carlton R. Croyle
Assistant Examiner—Richard Sher
Attorney—John R. Faulkner and Clifford L. Sadler

[57] ABSTRACT

A hydraulic steering system for a motor vehicle having a primary fluid pressure source and a secondary pressure source. The secondary source comprises a pump driven by the vehicle's transmission upon demand and which is inoperative when the primary pressure source is functioning properly.

1 Claim, 2 Drawing Figures

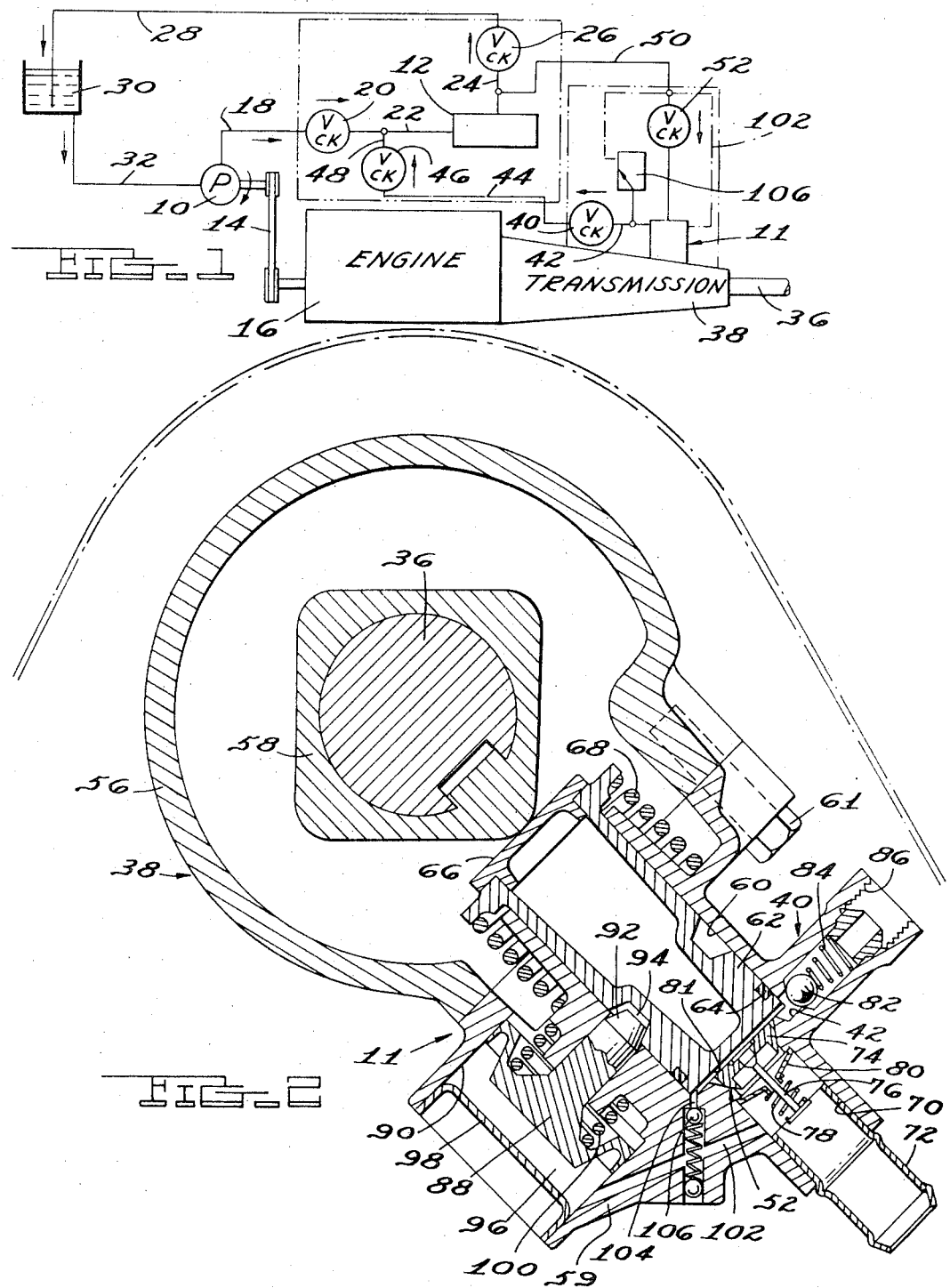

3,733,148

PUMP SUITABLE FOR A HYDRAULIC STEERING POWER SYSTEM HAVING AN AUXILIARY POWER SOURCE

This application is a division of application Ser. No. 763,228 filed Sept. 27, 1968 for HYDRAULIC STEERING SYSTEM HAVING AUXILIARY POWER SOURCE which has been abandoned in favor of continuation application Ser. No. 64,130 filed July 31, 1970.

BACKGROUND OF THE INVENTION

Power steering for a motor vehicle is provided to achieve two related objects. The power steering mechanism provides a power assist to reduce the steering effort required of the vehicle driver. Because the mechanism provides a power assist, it is also possible to achieve the second object of reducing the steering gear ratio. This functions to the driver's advantage by reducing the number of turns of the steering wheel that are necessary to execute a particular maneuver such as parking.

With the reduction in steering gear ratio there is an accompanying reduction in mechanical advantage so that if a failure of the hydraulic pressure source should occur, considerable energy is required of the vehicle operator to turn the wheel. A power steering system in which the pressure source is not functioning is more difficult to manage than a standard manual steering system. This is due, in part, to the lower steering gear ratio.

In view of the state of the art, it is a principal object of the present invention to provide a motor vehicle hydraulic steering system having an auxiliary pump circuit that is automatically activated in the event of a failure in the main power steering pump circuit so that the vehicle may continue to be operated effectively by the driver.

BRIEF SUMMARY OF THE DISCLOSURE

In the presently preferred embodiment of this invention, primary and auxiliary fluid pressure sources are provided for operating a power steering gear. The vehicle has a power steering pump driven by the engine which is in communication with the power steering gear. Fluid flows from the outlet of the gear to the sump of the primary pump circuit. An auxiliary pump has a piston which is driven by the transmission output shaft. The secondary pump piston is held in an inoperative position by a pilot device which is responsive to the outlet pressure of the steering gear. When the primary pressure source fails, the pilot piston moves to a position permitting the secondary pump piston to be actuated by a cam on the transmission output shaft. The secondary pump is in circuit with the steering gear and is isolated from the primary pump circuit by means of check valves.

BRIEF DESCRIPTION OF THE DRAWINGS

The many objects and advantages of the present invention will become apparent upon consideration of the following detailed discussion and the accompanying drawings in which:

FIG. 1 is a diagrammatic representation of a motor vehicle power steering system according to the present invention; and FIG. 2 is an elevational view in section of an auxiliary pump for the system of FIG. 1.

DETAILED DESCRIPTION OF THE PREFERRED EMBODIMENT

Referring now to the drawings wherein the presently preferred embodiment of this invention is illustrated FIG. 1 discloses, in diagrammatic form, a hydraulic power steering system for a motor vehicle. The system of FIG. 1 includes a primary pump 10 and an auxiliary pump 11 having appropriate circuitry constructed to provide pressurized fluid to a power steering gear 12. This steering gear unit 12 is of a known type having a movable piston integral with a worm. The worm moves upon displacement of the piston by fluid pressure applied to one side or the other thereof in a known manner.

The primary pressure source for the power steering gear 12 includes the primary pump 10 which is driven by a belt 14 connected to the vehicle engine 16. A hydraulic line 18 conveys fluid pressure from the outlet of the primary pump 10 through a check valve 20. Hydraulic line 22 connects the check valve 20 with the power steering gear unit 12. Hydraulic line 24 connects the outlet or the return flow port of the steering gear 12 to the check valve 26. Line 28 joins the check valve 26 with the sump 30. The circuit is completed by a hydraulic line 32 which conveys fluid from the sump 30 to the pump 10.

This portion of the circuit operates in a reasonably conventional fashion with the pump 10 providing hydraulic fluid under pressure to the steering gear unit 12 which, in turn, provides a power assist to the operation of the steering gear.

In accordance with the present invention, auxiliary means is provided to bring hydraulic fluid under pressure to the steering gear in the event the primary pressure source should fail. In accordance with the invention, the auxiliary circuit includes the auxiliary pump 11 which is driven by the output shaft 36 of the vehicle transmission 38. As indicated in the drawings, transmission 38 is connected to the engine 16. The output of the pump 11 flows through a check valve 40 to which it is connected by means of a passage 42. Hydraulic line 44 connects the check valve 40 with a second check valve 46. A short hydraulic line 48 taps into the line 22 of the power steering gear 12 and is connected to the check valve 46. Line 50 is connected to the return line 24 leading from the outlet of the power steering gear 10. Fluid flowing through the hydraulic line 50 passes through check valve 52 into the interior of the pump 11.

The construction of the auxiliary pump 11, check valves 40 and 52 and related structure is illustrated in greater detail in FIG. 2. In FIG. 2, the transmission 38 has a housing 56 which rotatably supports the transmission output shaft 36. A cam 58 is keyed to the shaft 36. The housing 59 for the pump 11 is secured to the transmission housing 56 by bolts 61. The pump housing 59 is formed with a bore 60 in which a pump piston 62 is slidably received. The pump piston 62 has a seal 64 at its upper end in sliding engagement with the wall of the bore 60. A bearing plate 66 is secured to the end of the piston 62 for sliding engagement with the rotating cam 58. A coil spring 68 biases the piston in a direction to place the bearing plate 66 in engagement with the cam 58.

The inlet for the pump 11 includes a bore 70 to which a fitting 72 is secured for connection with the hydraulic line 50. The check valve 52 for the pump 11 comprises a valve element 74 that has a stem 76 secured to it. A coil spring 78 is interposed between the end of the stem 76 and a collar 80 which forms a stationary spring seat. The spring 78 urges the valve element 74 into a closed position against a valve seat machined in the housing 59 as illustrated in FIG. 2.

The coil spring 78 of the check valve 52 lightly urges the element 74 to a seated position. When the pump piston 62 is moved toward the axis of the transmission output shaft 36 by the spring 68, the drop in pressure within pressure chamber 81 of the pump will cause the valve element 72 to unseat and to permit fluid to flow into the bore 60. During a pressure stroke of the piston 62, fluid within the bore will be prevented from returning to the inlet passage 70 by the check valve 52.

Check valve 40 is placed in the outlet of the pump 11. The check valve 40 comprises a ball-shape valve element 82 that is pressed by a spring 84 to a closed position against a valve seat. Passage 42 conveys fluid to the check valve 40 from the chamber 81 of the pump 11. The outlet of the check valve 40 is constructed at 86 to receive a fitting for attachment of the hydraulic line 44.

A pilot piston 88 is positioned within a bore 90 formed in the housing 59. The piston 88 has a stem portion 92 that is constructed to engage a notch 94 formed on the side of the secondary pump piston 62. A chamber 96 is formed on the back side of the piston 88 by means of a cap 98 which seals the bore 90. A coil spring 100 is interposed between the housing 59 and the pilot piston 88 and it exerts a force tending to move the portion 92 of pilot piston 88 outwardly away from the notch 94 in the pump piston 62. The chamber 96 communicates with the inlet bore 70 of the pump 11 by means of a passage 102 drilled in the housing 59. With this construction when the hydraulic fluid in the inlet bore 70 is pressurized, chamber 96 will also be pressurized thereby causing the piston 88 to move into engagement with the pump piston 62. When the nose 92 of the pilot piston 88 is seated in the groove 94, the pump piston 62 will be held outwardly out of engagement with the cam 58. This will occur whenever the inlet pressure to the pump 11 is of appropriate magnitude. It will be noted from FIG. 1 that the inlet pressure to the pump 11 is also the outlet pressure of the power steering gear 12.

A short passage 104 connects the pressure chamber 81 of the pump piston 62 with a pressure release valve 106. The pressure release valve is in communication with the passage 102 at the inlet of the pump.

OPERATION

During normal or conventional operation, the primary power steering pump 10 is the sole pump providing pressure fluid for the power steering gear 12. The primary pump 10 is driven by the motor 16 and delivers fluid under pressure through the lines 18 and 22 to the power steering gear 12. Fluid returns to the sump 30 by means of the lines 24 and 28. Check valves 26 and 20 prevent flow of fluid in the opposite direction. In addition, check valve 46 prevents flow of fluid to the secondary pressure source.

Thus, during normal operation flow is from the primary pump 10 across the check valve 20 to the steering gear 12 and returning to the reservoir sump 30 flowing across the check valve 26. The pressure differential across the valve 26 is sensed on the area of the pilot piston 88 of the secondary pump assembly 11. This pressure moves the pilot piston 88 inwardly against the spring 100 allowing the piston stem 92 to engage the notch 94 in the pump piston 62. This engagement holds the pump piston 62 away from the cam 58 and in this condition, the secondary pump assembly 11 is inoperative.

When there is a failure in the primary pump 10 or of the elements that drive the pump 10, the pressure differential across the check valve 26 will decrease and thereby reduce the force on the pilot piston 88 of auxiliary pump assembly 11. This allows the piston spring 100 to move the piston 88 outwardly drawing the piston stem 92 out of engagement with the pump piston 62. The piston spring 68 returns the pump piston 62 into engagement with the cam 58 and as the cam rotates pumping will occur. Fluid will then flow across the check valves 40 and 46 through the steering gear assembly 12, and returning to the pump 11 across the check valve 52. Pumping continues as long as the transmission drive shaft rotates. Thus, if the primary pump 10 should cease to operate due to a failure of the engine 16 the auxiliary pump 11 would commence to function and produce fluid pressure for the steering gear 12 during the period when the vehicle is coasting to a halt.

The fluid line 50 from the steering gear assembly 12 to the auxiliary pump 11 serves as its fluid reservoir. Maximum flow of pump 11 is controlled by the force of the piston spring 68 which will hold the piston 62 to the cam 58 up to a predetermined speed of the cam.

Valve 104 serves as a pressure relief valve for pump assembly 11 and determines the maximum pressure of the auxiliary circuit.

SUMMARY

In accordance with the present invention, a power steering system for a motor vehicle is provided having a primary fluid pressure source and a secondary fluid pressure source that operates only when the primary source fails. The secondary source is driven by the transmission output shaft and has a pump piston which engages the cam on the shaft only when there is a failure or lack of pressure in the primary circuit.

While the invention has been illustrated in the preferred embodiment, it will be clear to those skilled in the art that changes and modifications may be made without departing from the scope of the invention.

I claim:

1. An auxiliary hydraulic fluid pump assembly having a fluid inlet passage that is constructed to be operative when the fluid pressure in said inlet passage falls below a preset minimum, said pump comprising a housing having a cylindrical portion with an interior surface defining a first bore, a pump piston reciprocable between first and second positions within said first bore, eccentric driving means constructed to engage one end of said pump piston and cause the reciprocation thereof, said pump piston having a peripheral flange adjacent its said one end, a first coil spring surrounding said cylindrical portion and engaging said flange, said first coil spring being constructed to urge said pump piston into engagement with said eccentric driving means, the other end of said piston and said first bore defining an expansible chamber, a fluid discharge passage and said fluid inlet passage communicating with said chamber, a first check valve disposed in said fluid discharge passage and a second check valve disposed in said fluid inlet passage, a second bore in said housing arranged along an axis generally perpendicular to the axis of said pump piston, said second bore having a large bore portion and a small bore portion, said small bore portion opening into said first bore, a blocking piston having a large piston portion slidably mounted in said large bore portion, said pump piston having an annular recess on its side, said blocking piston having a pilot portion disposed in said small bore portion, said blocking piston being reciprocable in said second bore between an extended position and a retracted position, said pilot portion being constructed to protrude inwardly from the end of said small bore portion and engage said annular recess of said pump piston when said block piston is in its said extended position and thereby prevent the reciprocation of said pump piston, a second coil spring arranged concentrically with respect to said pilot portion and engaging said large piston portion, said second coil spring being constructed to urge said blocking piston to its said retracted position and said pilot portion out of engagement with said pump piston, a fluid chamber disposed within said housing and defined in part by said large piston portion of said blocking piston and said large bore portion of said second bore, passage means disposed in said housing constructed to provide fluid pressure communication between a point in said inlet passage upstream of said second check valve and said fluid chamber whereby fluid pressure in said inlet passage urges said pilot portion against the force of said second coil spring acting upon said blocking piston and into engagement with said pump piston.

* * * * *